(12) United States Patent
Khellah et al.

(10) Patent No.: US 10,403,266 B2
(45) Date of Patent: Sep. 3, 2019

(54) DETECTING KEYWORDS IN AUDIO USING A SPIKING NEURAL NETWORK

(71) Applicant: Intel Corporation, Santa Clara, CA (US)

(72) Inventors: Muhammad Khellah, Tigard, OR (US); Oren Arad, Palo Alto, CA (US); Binuraj Ravindran, San Jose, CA (US); Somnath Paul, Hillsboro, OR (US); Charles Augustine, Portland, OR (US); Bruno Umbria Pedroni, La Jolla, CA (US)

(73) Assignee: Intel Corporation, Santa Clara, CA (US)

( * ) Notice: Subject to any disclaimer, the term of this patent is extended or adjusted under 35 U.S.C. 154(b) by 3 days.

(21) Appl. No.: 15/786,803

(22) Filed: Oct. 18, 2017

(65) Prior Publication Data

US 2019/0115011 A1    Apr. 18, 2019

(51) Int. Cl.
*G10L 15/16*     (2006.01)
*G10L 15/02*     (2006.01)
*G10L 25/30*     (2013.01)
*G06N 3/04*      (2006.01)
*G10L 15/06*     (2013.01)

(52) U.S. Cl.
CPC ............. *G10L 15/02* (2013.01); *G06N 3/049* (2013.01); *G10L 15/063* (2013.01); *G10L 25/30* (2013.01); *G10L 2015/0635* (2013.01)

(58) Field of Classification Search
CPC ......... G10L 15/16; G10L 15/00; G10L 15/06; G10L 15/18; G10L 15/183; G10L 15/26

USPC .......................... 704/232, 251, 231, 255, 257
See application file for complete search history.

(56) References Cited

U.S. PATENT DOCUMENTS

| 2003/0088412 A1* | 5/2003 | Shetty .................... G10L 15/14 704/243 |
| 2017/0229117 A1* | 8/2017 | van der Made ....... G06N 3/049 |
| 2018/0018558 A1* | 1/2018 | Lee ......................... G06N 3/063 |

OTHER PUBLICATIONS

Arik et al., "Convolutional Recurrent Neural Networks for Small-Footprint Keyword Spotting," arXiv preprint 3rXiv:1703.05390, viewed on Oct. 17, 2017, 5 pages, USA.
Baljekar et al., "Online word-spotting in continuous speech with recurrent neural networks," Spoken Language Technology Workshop (SLT), 2014 IEEE, 6 pages, USA.
Chen et al., "Small-footprint Keyword Spotting Using Deep Neural Networks," ICASSP, 2014, 5 pages, USA.
Gales et al., "The Application of Hidden Markov Models in Speech Recognition," Foundations and Trends in Signal Processing archive vol. 1 Issue 3, Jan. 2008, 110 pages, United Kingdom.
Hwang et al., "Online keyword spotting with a character-level recurrent neural network." arXiv preprint arXiv:1512.08903, viewed on Oct. 17, 2015 from Dec. 2015, 10 pages, USA.

(Continued)

*Primary Examiner* — Qi Han
(74) *Attorney, Agent, or Firm* — International IP Law Group, P.L.L.C.

(57) ABSTRACT

An example apparatus for detecting keywords in audio includes an audio receiver to receive audio comprising a keyword to be detected. The apparatus also includes a spike transducer to convert the audio into a plurality of spikes. The apparatus further includes a spiking neural network to receive one or more of the spikes and generate a spike corresponding to a detected keyword.

22 Claims, 10 Drawing Sheets

(56) References Cited

OTHER PUBLICATIONS

Mostafa et al., "Fast Classification Using Sparsely Active Spiking Networks," in IEEE International Symposium on Circuits and Systems (ISCAS), 2017, 4 pages, USA.
Sainath et al., "Convolutional Neural Networks for Small-footprint Keyword Spotting", Interspeech, 2015, 5 pages, USA.
Tucker et al., "Model Compression Applied to Small-Footprint Keyword Spotting," Interspeech, 2016, 5 pages, USA.

* cited by examiner

400B

400C

400D

400E

500

600

DETECTING KEYWORDS IN AUDIO USING A SPIKING NEURAL NETWORK

BACKGROUND

Keyword spotting (KWS) is the task of identifying the onset of certain keywords or key-phrases among continuous speech. For example, KWS may include extracting fragments of speech, known as phonemes, and observing the sequence of phonemes to verify the presence of a keyword.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
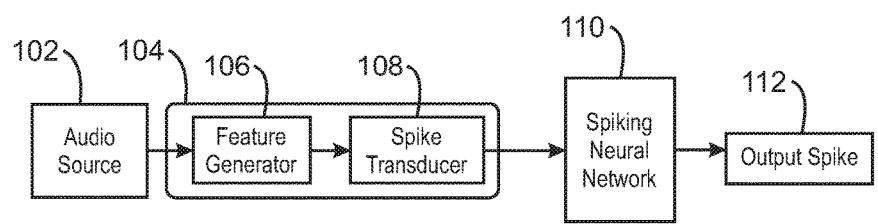
FIG. 1 is a block diagram illustrating an example system for detecting keywords in audio using a spiking neural network.

As discussed above, keyword spotting may include extracting fragments of speech, known as phonemes, and observing the sequence of phonemes to verify the presence of a keyword. As used herein, a phoneme is a unit of sound that distinguishes one word from another in a particular language. However, high power consumption by today's always-on keyword spotting solutions may result in limited keyword recognition capability in battery powered systems. For example, battery-powered systems may only be capable of detecting less than 10 keywords. In systems with larger keyword support, more power may be provided by a wall-connected power-supply. The power overhead of existing solutions may be especially high for always on (AON) systems. In some instances, power usage can be even higher depending on the model size in the detection to achieve higher accuracy and false detection in very challenging noise environments.

The present disclosure relates generally to techniques for detecting keywords in audio using a spiking neural network. Specifically, the techniques described herein include an apparatus, methods and system for training and using a spiking neural network to detect keywords in audio. An example apparatus includes an audio receiver to receive audio including a keyword to be detected. The apparatus also can include a feature generator to generate a plurality of features based on the audio, the features to be converted into spikes by the spike transducer. The apparatus also includes a spike transducer to transduce the audio into spikes. For example, the spikes may be binary events indicating a threshold has been exceeded. The apparatus further includes a spiking neural network to receive one or more of the spikes and generate a spike corresponding to a detected keyword. For example, the spiking neural network may be trained in advance using techniques described herein.

The techniques described herein thus enable a low-power solution for keyword spotting using a sparsely active network based on spikes. The techniques described herein can be used to improve the ability of an always-on keyword spotting system with the ability to recognize more keywords. In particular, the spiking neural network may be a type of sparsely active neural (SAN) network that only processes data as needed. Such an event-driven approach may keep the system inactive unless there is a speech stimulus, thus reducing the power consumption during inactivity. Additionally, since the SAN network operates using spikes, the types of computations used may be considerably simpler than existing solutions, resulting in additional hardware and power savings while maintaining accuracy. For example, the techniques may provide up to an 82% reduction in computation within hidden-layers of the neural network. Moreover, since computations using spikes are very simple, less processing may result in greater power efficiency. For example, multiplications can be converted to simple additions. In addition, very few hidden layer neurons of the trained SAN disclosed herein may elicit spikes before an output neuron spikes, thus resulting in a more power-efficient continuous KWS solution. In addition, in one example, the techniques described herein provide for continuous KWS using SANs that directly identify an entire keyword or key-phrase from speech without the need for separate acoustic and language models. For example, a key-phrase may include two or more words spoken contiguously in order. In another example, the techniques described herein provide for acoustic model scoring to map feature vectors to senones and use a decision logic to detect the sequence of senones to match the key-phrase to reduce power usage. Given the lower power overhead, the techniques described herein therefore enable battery-powered designs with an increased the number of microphone sensor arrays and larger model sizes to enable features such as speaker identification.

FIG. 1 is a block diagram illustrating an example system for detecting keywords in audio using a spiking neural network. The example system is referred to generally by the reference number 100 and can be implemented in the computing device 600 below in FIG. 6 using the methods 400 and 500 of FIGS. 4 and 5 below.

The example system 100 includes an audio source 102 and a front-end module 104. The front-end module 104 includes a feature generator 106 and a spike transducer 108. The system 100 further includes a spiking neural network

110. The spiking neural network 110 is shown outputting an output spike 112. For example, the single output spike 112 may correspond to a detected keyword.

As shown in FIG. 1, the system 100 may receive audio input from an audio source 102 and output a single output spike 112 corresponding to a detected keyword in the received audio input. For example, the audio source 102 may be a microphone.

In some examples, the front-end module 104 may receive the audio input for preprocessing. The feature generator 106 can generate features including audio parameters. For example, the feature generator 106 can generate a mel-frequency cepstrum (MFC) representation of the received audio input. As used here, an MFC is a representation of the short-term power spectrum of a sound, based on a linear cosine transform of a log power spectrum on a nonlinear mel scale of frequency. A mel scale is a perceptual scale of pitches judged by listeners to be equal in distance from one another. The MFC may be made up of mel-frequency cepstral coefficients (MFCCs) derived from a type of cepstral representation of the audio. A cepstrum is an inverse Fourier transform (IFT) of the logarithm of the estimated spectrum of a signal. The MFCCs generated by the feature generator 106 may be sent to the spike transducer 108. In some examples, any other suitable audio features may be generated. For example, the features may include linear predictive coding (LPC) features, or mel-frequency spectral coefficient (MFSC) features, among other audio features. In some examples, the features may be generated using a sliding sample window as described in FIGS. 4A-4E below.

The spike transducer 108 of the front-end module 104 can convert audio features such as MFCCs to spikes. As used herein, spikes refer to information sent to or between neurons. In some examples, spikes may originate externally from a sensor or a transducer. In some examples, the spikes may originate internally from another neuron. For example, a neuron may be activated when a membrane potential exceeds a threshold value and send out a spike. As used herein, a membrane potential refers to a score associated with each neuron that can be modified by the spikes produced by other neurons. In some examples, when a neuron of the neural network fires, the neuron may generate information that travels to other neurons. The signal sent to other neurons, in turn, may increase or decrease the membrane potentials of the other neurons when the weight is positive or negative, respectively. As described in greater detail with respect to FIG. 2 below, the spikes from the spike transducer 108 can be input into an input layer of the spiking neural network 110. The spiking neural network 110 may be trained to output a single output spike 112. For example, the output spike 112 may correspond to a detected keyword. In some examples, a system can then use the corresponding detected keyword in any suitable application. For example, the keyword may be used in a voice control application.

The diagram of FIG. 1 is not intended to indicate that the example system 100 is to include all of the components shown in FIG. 1. Rather, the example system 100 can be implemented using fewer or additional components not illustrated in FIG. 1 (e.g., additional audio samples, audio processors, filters, spikes, neural networks, etc.).

Figure 2:
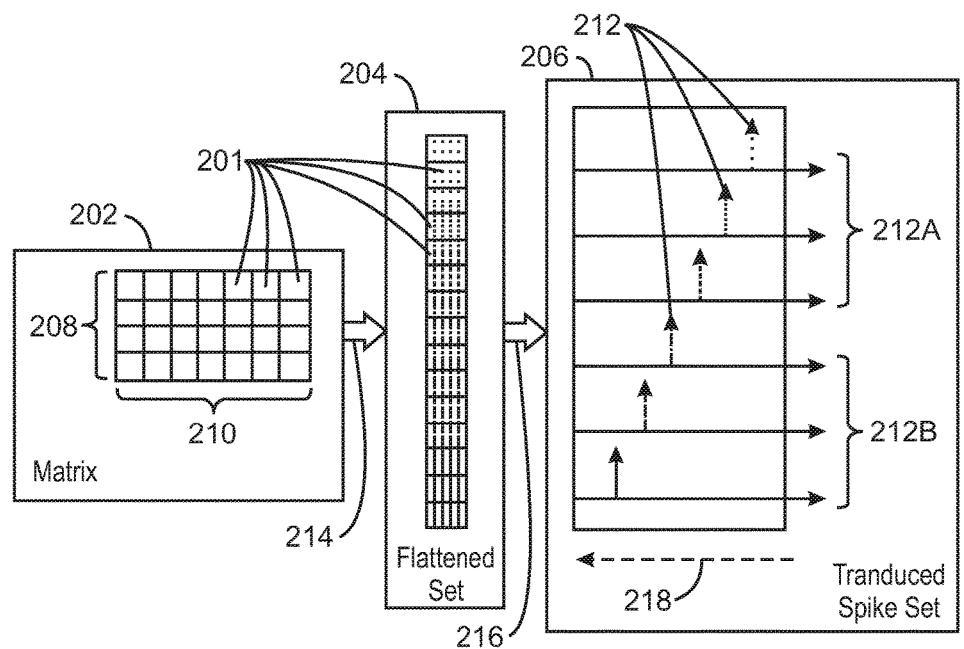
FIG. 2 is a block diagram illustrating an example spike transducer for converting audio to spikes.

FIG. 2 is a block diagram illustrating an example spike transduction for converting audio to spikes. The example spike transduction is generally referred to by the reference number 200 and can be implemented in the system 100 of FIG. 1 above or the computing device 600 below. For example, the spike transduction 200 can be implemented in the spike transducer 108 of the front-end 104 of the system 100 of FIG. 1, the spike transducer 634 of the computing device 600 of FIG. 6 below, or the spike transducer module 710 of the computer readable media 700 of FIG. 7 below.

FIG. 2 shows a set of features 201 organized into a feature matrix 202. FIG. 2 also includes a flattened set of features 204 and a transduced spike set 206. The feature matrix 202 includes four rows of features 208 with seven columns of frames 210. The transduced spike set 206 includes spikes 212. The spikes 212 include faster spikes 212A and slower spikes 212B. For example, faster spikes 212A may take a shorter amount of time to spike, while slower spikes 212B may take a longer amount of time before spiking. An arrow 218 is shown indicating that relative spiking time of the spikes 212 is increasing from right to left.

Figure 3:
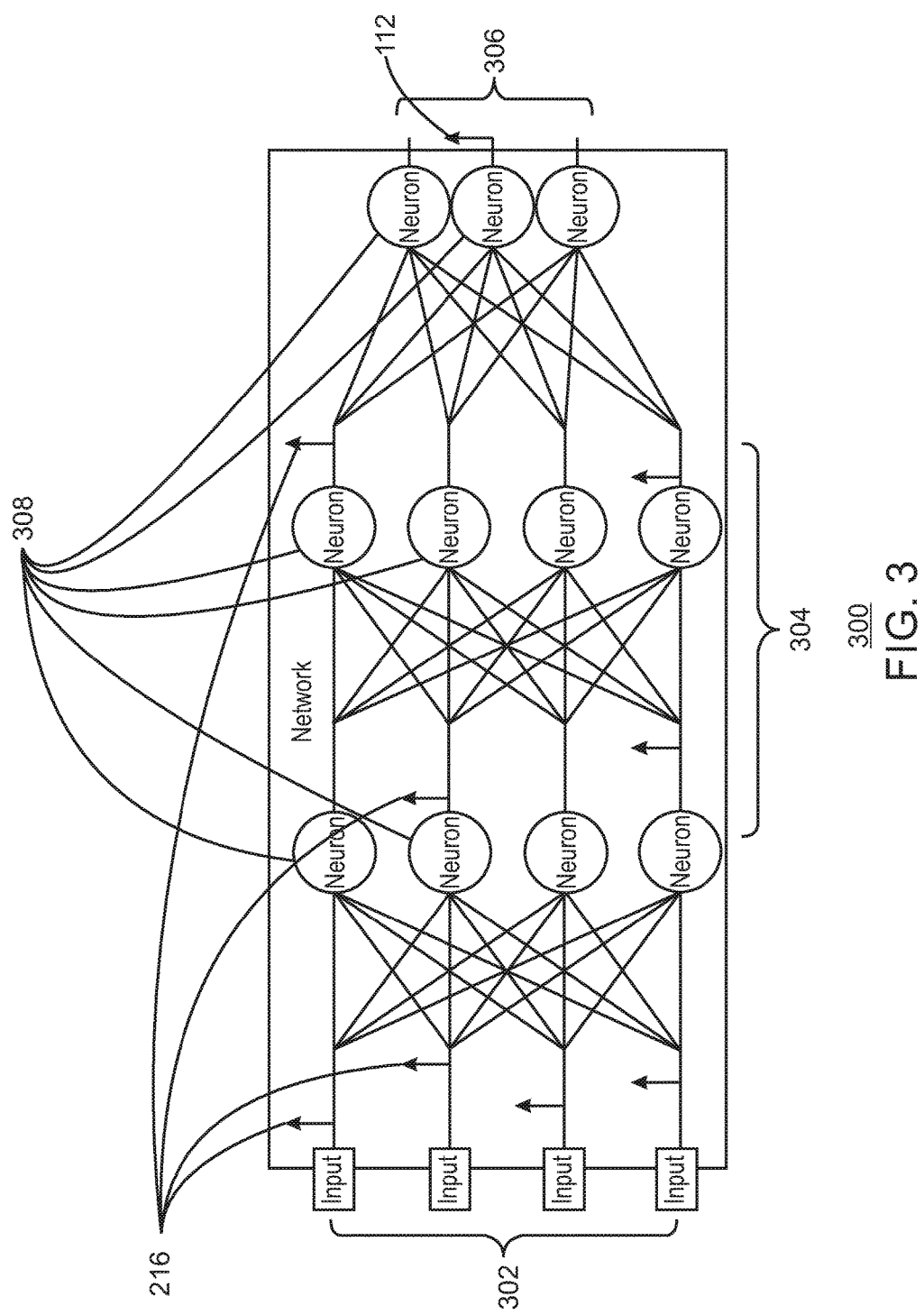
FIG. 3 is a block diagram illustrating an example spiking neural network for detecting keywords.

As shown in FIG. 2, the spike transduction 200 may begin with a set of features 201 arranged in a matrix 202. For example, the features 201 may be MFCCs. As indicated by an arrow 214, the matrix 202 may be flattened into a single column of features. In some examples, the features 201 may be ordered by intensity. For example, higher intensity features may be ordered on top and indicated by dashed lines, while lower intensity features are ordered lower and indicated by solid lines. As indicated by an arrow 216, the features 201 in the flattened set 204 are converted into spikes 212. For example, features with high intensity values (shown in dotted lines) are converted to single spikes 212A which occur soon after the data sample is transduced. On the other hand, low-intensity features (shown in more solid lines) are converted to spikes 212B that occur toward the end of the data sample frame. In some examples, faster spikes 212A may cause a spiking neural network to fire neurons in the output classification layer before slower spikes 212B. Therefore, the faster spikes 212A and slower spikes 212B may be fed into a spiking neural network earlier and later in time, respectively. In some examples, the faster spikes 212 may cause an output spike (not shown) to be generated by the spiking neural network, making the input of slower spikes 212B not necessary. Thus, resources may be saved by only inputting a subset of the faster spikes 212A into a spiking neural network. For example, as shown in FIG. 3 below, four of the higher spikes 212 may be input into the spiking neural network. Moreover, using faster spikes 212A may increase the speed of an output spike being output from a spiking neural network. For example, the earlier the input, the higher the probability may be that output neuron will spike earlier.

The diagram of FIG. 2 is not intended to indicate that the example spike transduction 200 is to include all of the components shown in FIG. 2. Rather, the example spike transduction 200 can be implemented using fewer or additional components not illustrated in FIG. 2 (e.g., additional spikes, features, frames, matrixes, etc.).

FIG. 3 is a block diagram illustrating an example spiking neural network for detecting keywords. The example spiking neural network is generally referred to by the reference number 300 and can be implemented in the computing device 600 below. For example, the spiking neural network 300 can be the spiking neural network 110 of the system of FIG. 1, the spiking neural network 636 of the computing device 600 of FIG. 6 below, or the spiking neural network module 712 of the computer readable media 700 of FIG. 7 below.

The spiking neural network 300 of FIG. 3 includes an input layer 302 with a set of four inputs. The spiking neural network 300 also includes a pair of hidden layers 304. The spiking neural network 300 further includes an output layer 306 including three outputs. The spiking neural network 300 includes a number of spikes 216 at various layers of the spiking neural network 300. An output spike 112 is shown at the output layer 306.

In some examples, the spiking neural network 300 may be a sparsely active network (SAN). For example, a SAN may be a deep spiking neural network formed by an input layer 302, one or many hidden layers 304, and an output layer 306. The network architecture may include layers of spiking neurons 216, with each neuron 216 operating independently. For example, the spiking neurons 216 may be said to be processed in parallel. In some examples, the SAN may compute internal variable updates only at the onset of an incoming spike from the previous network layer. For example, the neuron model may be the biologically-inspired integrate-and-fire neuron model. Each neuron 308 may have two state variables: a synaptic current and membrane potential. For example, the synaptic current may be a leaky integrator, while the membrane potential may be a non-leaky integrator. The communication between all layers 302, 304, 306 may be performed in a feed-forward manner. For example, there may be no recurrent connections in the SAN.

In some examples, each neuron 308 may operate by integrating incoming spikes 216 into its synaptic current variable and applying the current to its membrane potential variable. Once a membrane potential variable crosses a pre-defined threshold, a neuron may generate a new spike 216. In the SAN 300, each hidden 304 and output 306 layer neuron 308 may be allowed to produce a maximum of one spike 216 per input data sample. In some examples, the number of neurons 308 in the hidden layers 304 can be defined by the user. The number of neurons in the output layer 306 may be equal to the number of possible classes (or "labels") of the discrimination task plus one. For example, the classes may be keywords, phonemes, or senones, to be detected. Since the KWS may be operated continuously, the network must be able to classify the absence of any of the keywords or key-phrases. Therefore, the number of neurons in the output layer of the SAN is equal to the number of keywords or key-phrases the network plus one to classify the absence of any of the keywords or key-phrases.

In some examples, the execution of the SAN may include a transduction and an inference. For example, the SAN algorithm may first have data converted, or transduced, into an event-based format. For example, the data may be raw spoken speech data. The transduction constitutes part of the pre-processing stage of the algorithm. Transduction may be performed by taking an N-dimensional input data sample and converting each input data sample to M features. For example, each feature may be an N-dimensional input data. The value of each of the M features may then be converted into a spike 216. In some examples, transduction can be performed on the input samples themselves instead of features. The time at which each spike 216 takes place may be defined by the intensity of the original input feature. For example, as used herein, intensity refers to features with higher values. The MFCC output from different filter banks can be of different values. For example, the MFCC output may be a value of 10 versus a value of 2. In some examples, a value of 10 may produce a spike faster (e.g., at time=1 unit) and a value of 2 may produce a spike slower (e.g., at time=8 units). In some examples, for every input data sample, there may be at most a single spike 216 produced.

In some examples, once the network 300 has been trained, an inference procedure may be performed by transducing the test data as described above and sequentially applying each adapted test data sample at the input 302 of the network 300. For a single transduced data sample, the neurons 308 may process incoming spikes 216 in an event-driven fashion. For example, computations may occur only at the onset of a new spike 216. In some examples, hidden layer neurons 308 may each generate their own spikes 216 once their membrane potential variable crosses a threshold. The network 300 may thus continue processing input spikes 216 until the output layer 306 elicits its first output spike 112. At this moment, the neuron 308 which has spiked in the output layer 306 may be considered a winner class. For example, each of the neurons 308 in the outer layer 306 may correspond to a different class, which may be a keyword or a key-phrase. The winner class may be the class associated with the input audio. In some examples, after the winner class is detected, the real-time system including the network 300 may halt until the next transduced data sample is ready for processing. For example, the system may then restart the entire process described above.

The network 300 is thus capable of efficiently reducing the number of spikes 216 required to produce an output. Since the spikes 216 can be interpreted as computations or operations, the SAN may reduce the amount of computation for a given detected keyword or key-phrase.

The diagram of FIG. 3 is not intended to indicate that the example spiking neural network 300 is to include all of the components shown in FIG. 3. Rather, the example spiking neural network 300 can be implemented using fewer or additional components not illustrated in FIG. 3 (e.g., additional inputs, layers, spikes, outputs, etc.). For example, although one output node is shown for each key-phrase in the example of FIG. 3, in some examples, multiple output nodes may exist for each key phrase. In some examples, multiple output nodes may be used for each key-phrase where the key phrase is mapped directly using spiking neural network without acoustic scoring.

Figure 4A:
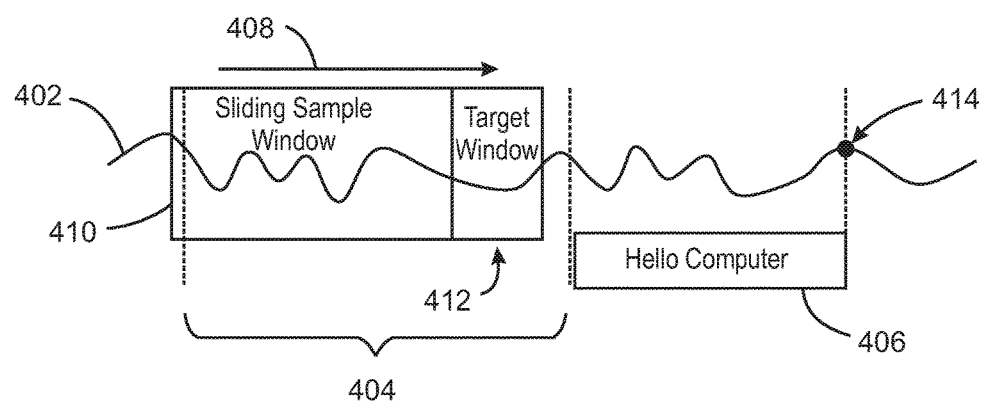
FIG. 4A is an example position of a sliding sample window in a labeling procedure for training and testing audio data.

FIG. 4A is an example position of a sliding sample window in a labeling procedure for training and testing audio data. The example position is referenced generally using the reference number 400A and can be implemented in the feature generator 106 of FIG. 1 above, the feature generator 732 of FIG. 7 below, or the feature generator module 808 of FIG. 8 below.

In FIG. 4A, an audio sample is shown divided into two parts using dashed lines, including a filler 404 and a key phrase 406. An arrow 408 indicates the direction of a sliding sample window 410. The sliding sample window 410 includes a target window 412. A key-phrase end marker 414 indicates the end of a key-phrase 406.

The example position 400A may be the beginning of a labeling procedure just before a key phrase 406 is detected. For example, the example key phrase shown in FIG. 4A is "hello computer." As shown in FIG. 4A, at the time of the window position 400A, the sliding sample window 410 and included target window 412 is positioned within the filler 404. For example, the filler 404 may be one or more sounds that do not include the key phrase 406 to be detected. In some examples, the label for a portion of the audio sample 402 within the sliding sample window 410 may be labeled as "blank" whenever a key-phrase end marker 414 is not present inside the target window.

In some examples, the position 400A may part of a generation of one or more features. For example, the features may be mel-frequency cepstral coefficients (MFCCs). In some examples, the feature generation may performed using one or more predetermined feature parameters. For example, MFCC parameters can include a number of features, a window size, and a step size. As one example, the predetermined number of features may be 13, the window size may be 25 milliseconds, and the step size may be 10 milliseconds. In some examples, for every position of the sampling window 410, features can be computed and flattened to form a single data sample. For example, the single input vector may be an input vector. In some examples, a sample window step size can be based on the feature step size. For example, the sample window step size can be the same as the step size of MFCCs, or 10 milliseconds. Thus, data samples can be produced at every 10 milliseconds of audio data.

In some examples, a width of the sample window 410 can be preset based on the duration of a longest key-phrase in a training set of key-phrases. For example, a sample window width can be set as 110% of duration of longest key-phrase. To continue the above example, if the longest key-phrase is 1.5 seconds, then the sample window width may be 1.1×1.5 or approximately 1.7 seconds.

In some examples, a size of the target window 412 can be based on the size of the sample window 410. For example, the size of the target window 412 can be preset as the final 10% of the sample window. For example, given a sample window width of 1.7 seconds, the target window may be approximately 170 milliseconds. In some examples, the size of the target window 412 can be set or adjusted by a user to improve accuracy.

The diagram of FIG. 4A is not intended to indicate that the example position 400A is to include all of the components shown in FIG. 4A. Rather, the example position 400A can be implemented using fewer or additional components not illustrated in FIG. 4A (e.g., additional sliding sample windows, target windows, key-phrases, audio data, etc.).

Figure 4B:
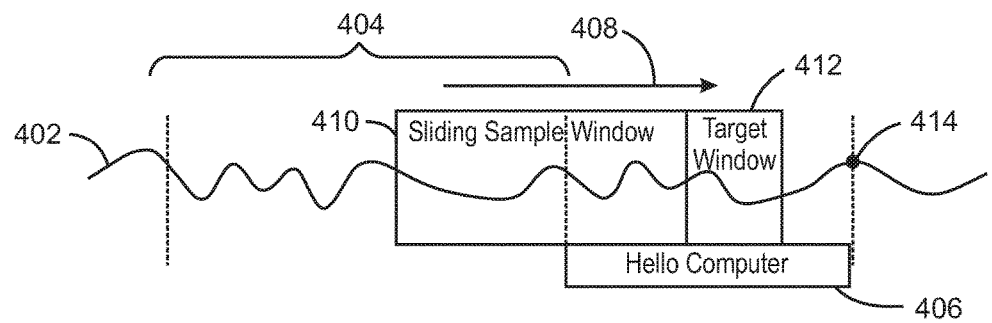
FIG. 4B is another example position of a sliding sample window in a labeling procedure for training and testing audio data.

FIG. 4B is another example position of a sliding sample window in a labeling procedure for training and testing audio data. The example position is referenced generally using the reference number 400B and can be implemented in the feature generator 106 of FIG. 1 above, the feature generator 732 of FIG. 7 below, or the feature generator module 808 of FIG. 8 below. FIG. 4B includes similarly numbered elements described in FIG. 4A above.

As shown in FIG. 4B, the position 400B of the sampling window 410 may have moved two window steps in the direction 408 of the audio sample 402 from the position 400A. For example, the position 400B may be shifted 20 milliseconds in the audio sample 402 from the position 400A. In some examples, since the target window 412 does not include the key-phrase end marker 414, the sample window data may also be labeled as "blank."

The diagram of FIG. 4B is not intended to indicate that the example position 400B is to include all of the components shown in FIG. 4B Rather, the example position 400B can be implemented using fewer or additional components not illustrated in FIG. 4B (e.g., additional sliding sample windows, target windows, key-phrases, audio data, etc.).

Figure 4C:
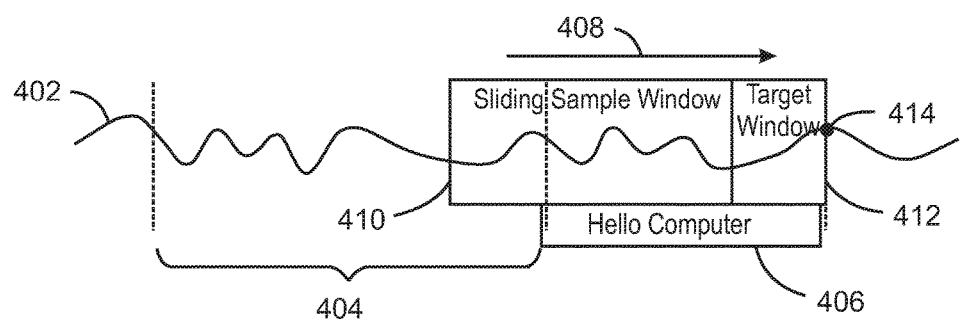
FIG. 4C is another example position of a sliding sample window in a labeling procedure for training and testing audio data.

FIG. 4C is another example position of a sliding sample window in a labeling procedure for training and testing audio data. The example position is referenced generally using the reference number 400C and can be implemented in the feature generator 106 of FIG. 1 above, the feature generator 732 of FIG. 7 below, or the feature generator module 808 of FIG. 8 below. FIG. 4C includes similarly numbered elements described in FIG. 4A above.

As shown in FIG. 4C, the position 400C of the sampling window 410 may have moved a window step in the direction 408 of the audio sample 402 from the position 400B. For example, the position 400C may be shifted 10 milliseconds in the audio sample 402 from the position 400B. In some examples, since the target window 412 includes the key-phrase end marker 414, the sample window data may also be labeled as the key-phrase. For example, the sample window data may be labeled "hello computer."

The diagram of FIG. 4C is not intended to indicate that the example position 400C is to include all of the components shown in FIG. 4C Rather, the example position 400C can be implemented using fewer or additional components not illustrated in FIG. 4C (e.g., additional sliding sample windows, target windows, key-phrases, audio data, etc.).

Figure 4D:
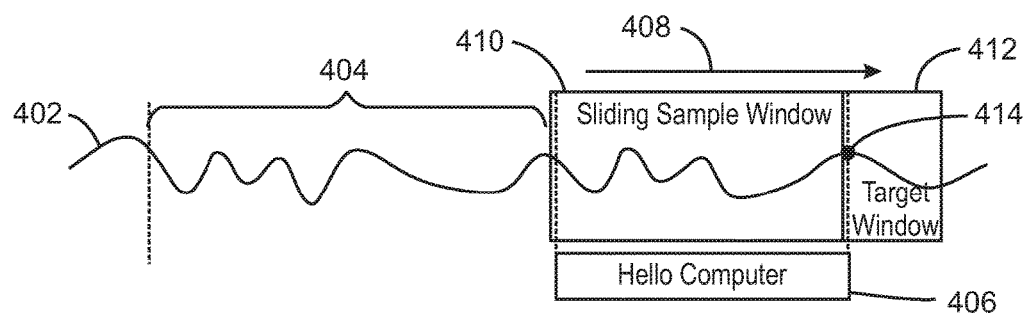
FIG. 4D is another example position of a sliding sample window in a labeling procedure for training and testing audio data.

FIG. 4D is another example position of a sliding sample window in a labeling procedure for training and testing audio data. The example position is referenced generally using the reference number 400D and can be implemented in the feature generator 106 of FIG. 1 above, the feature generator 732 of FIG. 7 below, or the feature generator module 808 of FIG. 8 below. FIG. 4D includes similarly numbered elements described in FIG. 4A above.

As shown in FIG. 4D, the position 400D of the sampling window 410 may have moved another window step in the direction 408 of the audio sample 402 from the position 400B. For example, the position 400D may be shifted another 10 milliseconds in the audio sample 402 from the position 400C. In some examples, since the target window 412 still includes the key-phrase end marker 414, the sample window data may also be labeled as the key-phrase. For example, the sample window data may be labeled "hello computer."

The diagram of FIG. 4D is not intended to indicate that the example position 400D is to include all of the components shown in FIG. 4D. Rather, the example position 400D can be implemented using fewer or additional components not illustrated in FIG. 4D (e.g., additional sliding sample windows, target windows, key-phrases, audio data, etc.).

Figure 4E:
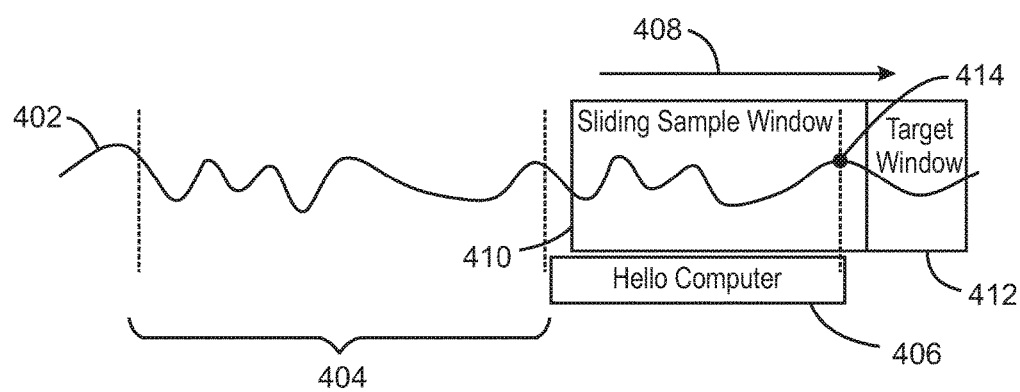
FIG. 4E is another example position of a sliding sample window in a labeling procedure for training and testing audio data.

FIG. 4E is another example position of a sliding sample window in a labeling procedure for training and testing audio data. The example position is referenced generally using the reference number 400E and can be implemented in the feature generator 106 of FIG. 1 above, the feature generator 732 of FIG. 7 below, or the feature generator module 808 of FIG. 8 below. FIG. 4E includes similarly numbered elements described in FIG. 4A above.

As shown in FIG. 4E, the position 400E of the sampling window 410 may have moved another window step in the direction 408 of the audio sample 402 from the position 400D. For example, the position 400E may be shifted 10 milliseconds in the audio sample 402 from the position 400D. In some examples, since the target window 412 no longer includes the key-phrase end marker 414, the sample window data may be labeled as "blank."

The diagram of FIG. 4E is not intended to indicate that the example position 400E is to include all of the components shown in FIG. 4E Rather, the example position 400E can be implemented using fewer or additional components not illustrated in FIG. 4E (e.g., additional sliding sample windows, target windows, key-phrases, audio data, etc.).

Figure 5:
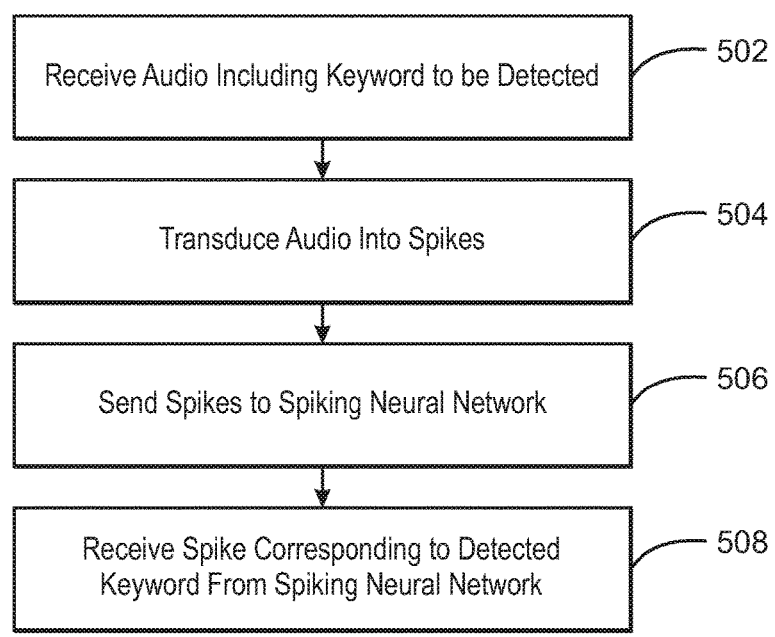
FIG. 5 is a flow chart illustrating a method for detecting keywords in audio using a spiking neural network.

FIG. 5 is a flow chart illustrating a method for detecting keywords in audio using a spiking neural network. The example method is generally referred to by the reference number 500 and can be implemented in the system 100 of FIG. 1 above, the processor 702 of the computing device 700 of FIG. 7 below, or the computer readable media 800 of FIG. 8 below.

At block 502, a processor receives audio including a keyword to be detected. In some examples, the keyword may be part of a key-phrase to be detected. For example, the audio may be clean audio or noisy audio. In some examples, noise audio may have a sound-to-noise ratio (SNR) of up to approximately 5 decibels.

At block 504, the processor transduces the audio into a plurality of spikes. In some examples, the processor can generate a number of features based on the audio and transduce the features into the spikes. For example, the processor can generate the features by computing mel-frequency cepstral coefficients based on a predetermined sliding sample window size and sliding sample window step size. In some examples, the processor can then concatenate the mel-frequency cepstral coefficients based on a duration of a keyword that is longer than other keywords. For example, the keyword may be a longest key phrase to be detected. In some examples, the sliding sample window step size can be based on a feature step size. For example, the feature step size may be approximately 10 milliseconds. In some examples, the processor can generating a matrix of features over a predetermined number of frames, flatten the features into an ordered set of features based on intensity, and transduce the ordered set of features into the plurality of spikes. In some examples, the processor can generate the plurality of features by computing linear predictive coding (LPC) features.

At block 506, the processor sends one or more of the spikes to a spiking neural network. For example, the spiking neural network may be trained using the method 600 described below. In some examples, the spiking neural network may be a sparsely activated network. For example, the sparsely activated spiking neural network may be activated upon receiving the one or more spikes from the processor.

At block 508, the processor receives a spike corresponding to a detected keyword from the spiking neural network. For example, the single spike received from the output of the spiking neural network may correspond to a keyword or a key-phrase. In some examples, the processor may then send the spike to an application. For example, the application may be a voice controlled application. In some examples, the processor may activate an idle mode in response to generating the spike corresponding to the detected keyword.

This process flow diagram is not intended to indicate that the blocks of the example process 500 are to be executed in any particular order, or that all of the blocks are to be included in every case. Further, any number of additional blocks not shown may be included within the example process 500, depending on the details of the specific implementation.

Figure 6:
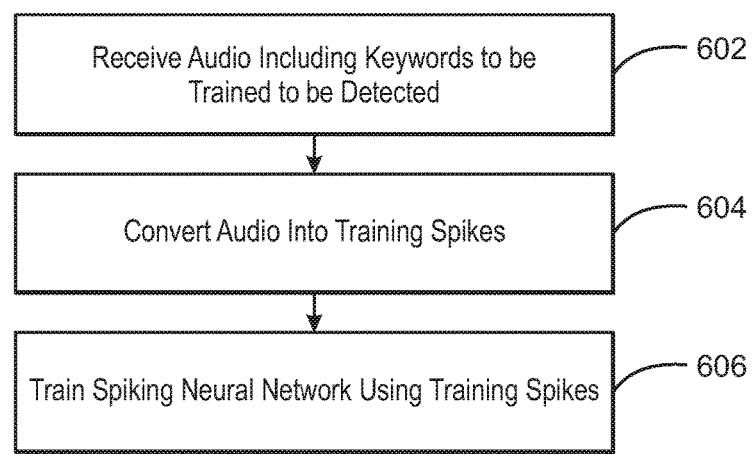
FIG. 6 is a flow chart illustrating a method for training a spiking neural network to detect keywords.

FIG. 6 is a flow chart illustrating a method for training a spiking neural network to detect keywords. The example method is generally referred to by the reference number 600 and can be implemented in the system 100 of FIG. 1 above, the computing device 700 of FIG. 7 below, or the computer readable media 800 of FIG. 8 below. For example, the method 500 can be used to train the spiking neural network 110, the spiking neural network 738, or the spiking neural network module 812. For example, training 600 can be performed offline. In some examples, an updated trained spiking neural network can be received from a remote computer, such as a server of a cloud service. For example, a SAN network can be updated if there is an updated model available from the cloud service.

At block 602, a processor receives audio including keywords that the network is to be trained to detect. For example, the audio may include audio samples of keywords on a list of keywords that the network is to be trained to detect.

At block 604, the processor converts the audio into training spikes. In some examples, the audio may be converted into features that are then transduced into the training spikes. For example, the features may be MFCCs.

At block 606, the processor trains the spiking neural network using the training spikes. For example, the processor may relate the time of each spike differentiably to the times of all spikes that had a causal influence on its generation. In some examples, a differentiable cost function of the spike times of the network can be chosen and network weight learning performed using a gradient descent and error backpropagation. By using spike times as the information-carrying quantities, working with discrete spike counts or spike rates can be avoided. Instead, a continuous representation of spike time that is amenable to gradient descent training can be used. This training approach may enable detailed control over the behavior of the network at the level of single spike times which may not be possible in training approaches based on rate-coding. The ultimate goal in training may be, therefore, to minimize the time the correct output neuron spikes. Such training may result in a small number of spikes produced in the internal hidden layers of the network. In some examples, the processor may train thousands of weights in the spiking neural network. For example, the weights can be 8-bit weights, 16-bit weights, or 32-bit weights.

This process flow diagram is not intended to indicate that the blocks of the example process 600 are to be executed in any particular order, or that all of the blocks are to be included in every case. Further, any number of additional blocks not shown may be included within the example process 600, depending on the details of the specific implementation.

Figure 7:
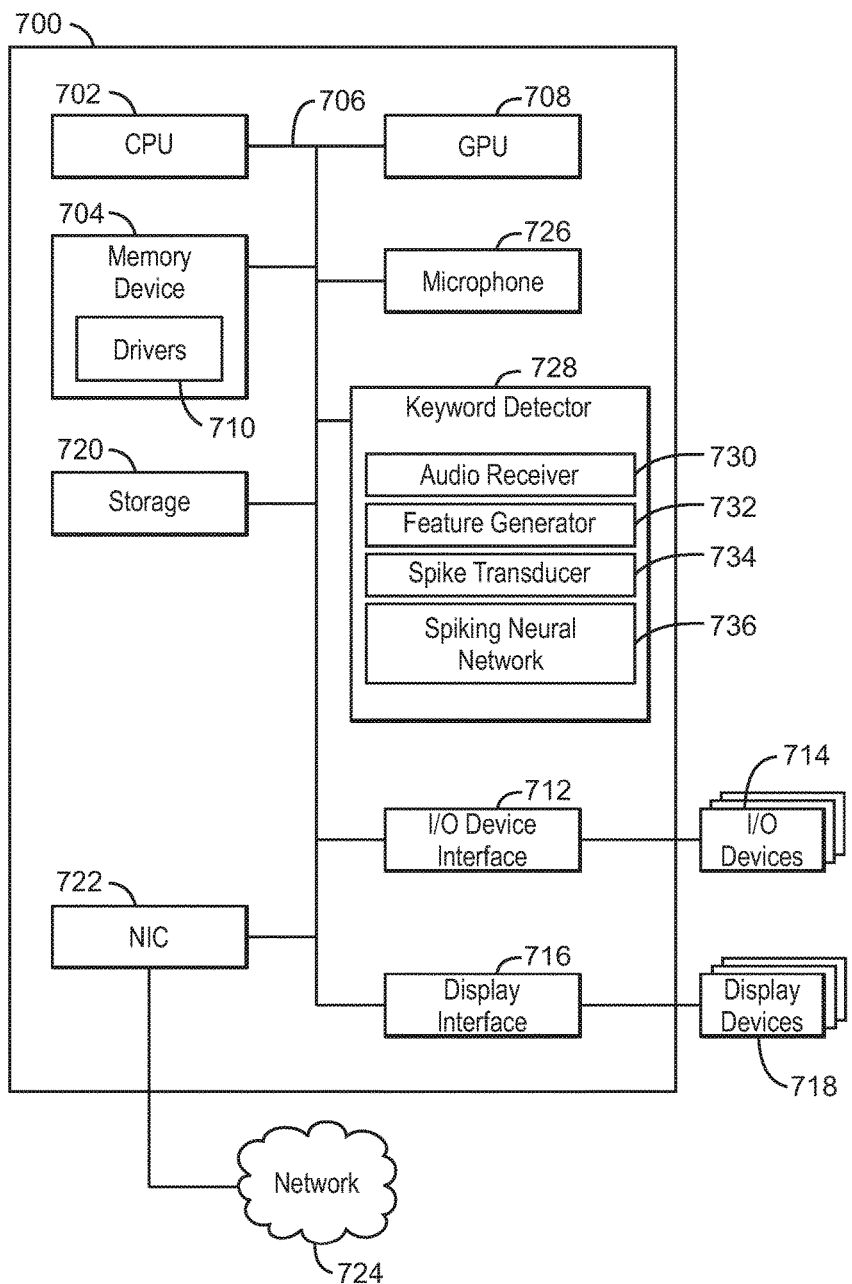
FIG. 7 is block diagram illustrating an example computing device that can detect keywords using a spiking neural network.

Referring now to FIG. 7, a block diagram is shown illustrating an example computing device that can detect keywords using a spiking neural network. The computing device 700 may be, for example, a laptop computer, desktop computer, tablet computer, mobile device, or wearable device, among others. In some examples, the computing device 700 may be a smart camera or a digital security surveillance camera. The computing device 700 may include a central processing unit (CPU) 702 that is configured to execute stored instructions, as well as a memory device 704 that stores instructions that are executable by the CPU 702. The CPU 702 may be coupled to the memory device 704 by a bus 706. Additionally, the CPU 702 can be a single core processor, a multi-core processor, a computing cluster, or any number of other configurations. Furthermore, the computing device 700 may include more than one CPU 702. In some examples, the CPU 702 may be a system-on-chip (SoC) with a multi-core processor architecture. In some examples, the CPU 702 can be a specialized digital signal processor (DSP) used for image processing. The memory device 704 can include random access memory (RAM), read only memory (ROM), flash memory, or any other suitable memory systems. For example, the memory device 704 may include dynamic random access memory (DRAM).

The memory device 704 can include random access memory (RAM), read only memory (ROM), flash memory, or any other suitable memory systems. For example, the memory device 704 may include dynamic random access memory (DRAM).

The computing device 700 may also include a graphics processing unit (GPU) 708. As shown, the CPU 702 may be coupled through the bus 706 to the GPU 708. The GPU 708 may be configured to perform any number of graphics operations within the computing device 700. For example, the GPU 708 may be configured to render or manipulate graphics images, graphics frames, videos, or the like, to be displayed to a user of the computing device 700.

The memory device 704 can include random access memory (RAM), read only memory (ROM), flash memory, or any other suitable memory systems. For example, the memory device 704 may include dynamic random access memory (DRAM). The memory device 704 may include device drivers 710 that are configured to execute the instructions for detecting keywords using a spiking neural network. The device drivers 710 may be software, an application program, application code, or the like.

The CPU 702 may also be connected through the bus 706 to an input/output (I/O) device interface 712 configured to connect the computing device 700 to one or more I/O devices 714. The I/O devices 714 may include, for example, a keyboard and a pointing device, wherein the pointing device may include a touchpad or a touchscreen, among others. The I/O devices 714 may be built-in components of the computing device 700, or may be devices that are externally connected to the computing device 700. In some examples, the memory 704 may be communicatively coupled to I/O devices 714 through direct memory access (DMA).

The CPU 702 may also be linked through the bus 706 to a display interface 716 configured to connect the computing device 700 to a display device 718. The display device 718 may include a display screen that is a built-in component of the computing device 700. The display device 718 may also include a computer monitor, television, or projector, among others, that is internal to or externally connected to the computing device 700.

The computing device 700 also includes a storage device 720. The storage device 720 is a physical memory such as a hard drive, an optical drive, a thumbdrive, an array of drives, a solid-state drive, or any combinations thereof. The storage device 720 may also include remote storage drives.

The computing device 700 may also include a network interface controller (NIC) 722. The NIC 722 may be configured to connect the computing device 700 through the bus 706 to a network 724. The network 724 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology. In some examples, the computing device 700 may receive updates to the spiking neural network 636 via the network 624. For example, the updates may include change in network size to enable additional keywords or key-phrases to be detected or updates to weights.

The computing device 700 further includes a microphone 726. The microphone 726 may include one or more transducers that can convert sounds into electrical signals. For example, the microphone 726 can be a dynamic microphone, a condenser microphone, a ribbon microphone, a carbon microphone, a piezoelectric microphone, a fiber optic microphone, or a MicroElectrical-Mechanical System (MEMS) microphone.

The computing device 700 further includes a keyword detector 728. For example, the keyword detector 728 can be used to detect one or more keywords. In some examples, the keyword detector 728 can be used to detect phonemes or senones that can be used to detect one or more complex keywords. As used herein, a senone refers to a state within context-dependent phones. For example, senones are the unit for which observation probabilities are computed during ASR. The pronunciations of all words may be represented by a sequence of senones. As one example, a senone could be the first state of all triphones where the central phone is /iy/, the right context is a nasal, and the left context is /t/. The keyword detector 728 can include an audio receiver 730, a feature generator 732, a spike transducer 734, and a spiking neural network 736. For example, the spiking neural network may be a sparsely active network. In some examples, each of the components 730-736 of the keyword detector 728 may be a microcontroller, embedded processor, or software module. The audio receiver 730 can receive audio including a keyword to be detected. The feature generator 732 can generate a plurality of features based on the audio. In some examples, the features can be mel-frequency cepstral coefficients. For example, the feature generator 732 can be compute mel-frequency cepstral coefficients based on a predetermined sliding sample window size and sliding sample window step size and concatenate the mel-frequency cepstral coefficients based on a duration of a keyword that is longer than other keywords. In some examples, a sliding sample window step size of the feature generator 732 can be based on a feature step size. For example, the sliding sample window step size of the feature generator 732 can be a function of the feature step size. The spike transducer 734 can transduce the audio into a plurality of spikes. For example, the spike transducer 734 can convert features into spikes. In some examples, the spike transducer 734 can convert the audio into the plurality of spikes using a sample window width based on a duration of a key-phrase that has a duration that is longer than other key-phrases. For example, the sample window width may be based on a longest key phrase to be detected. The spiking neural network 736 can receive one or more of the spikes and generate a spike corresponding to a detected keyword. In some examples, the spiking neural network can be trained using training spikes generated from training audio samples. For example, the spiking neural network 736 can be trained using the method 600 above. In some examples, the spike corresponding to the detected keyword can be output using acoustic scoring and a decision state machine. For example, acoustic scoring may include mapping generated feature vectors to senones using a spiking neural network. In some examples, the spiking neural network 736 can include an output layer including a number of neurons based on a number of trained keywords to be detected. For example, the output layer may include a number of neurons equal to the number of trained keywords plus one additional neuron for indicating that no keywords are detected. Thus, some of the neurons in the output layer may correspond to particular keywords, and one neuron may correspond to an indication that no keywords were detected. In some examples, the spiking neural network 736 can include an output layer with a predetermined number of neurons based on a number of trained phonemes or senones. For example, the spiking neural network 736 may be trained to detect complex key-phrases based on the phonemes or senones. In some examples, the spiking neural network 736 can enter an idle mode in response to generating the spike. For example, the spiking neural network 736 can enter the idle mode until a subsequent audio sample is received for processing.

The block diagram of FIG. 7 is not intended to indicate that the computing device 700 is to include all of the components shown in FIG. 7. Rather, the computing device 700 can include fewer or additional components not illustrated in FIG. 7, such as additional buffers, additional processors, and the like. The computing device 700 may include any number of additional components not shown in FIG. 7, depending on the details of the specific implementation. Furthermore, any of the functionalities of the audio receiver 730, the feature generator 732, the spike transducer 734, or the spiking neural network 736, may be partially, or entirely, implemented in hardware and/or in the processor 702. For example, the functionality may be implemented with an application specific integrated circuit, in logic implemented in the processor 702, or in any other device. In addition, any of the functionalities of the CPU 702 may be partially, or entirely, implemented in hardware and/or in a processor. For example, the functionality of the keyword detector 728 may be implemented with an application specific integrated circuit, in logic implemented in a processor, in logic implemented in a specialized graphics processing unit such as the GPU 708, or in any other device.

Figure 8:
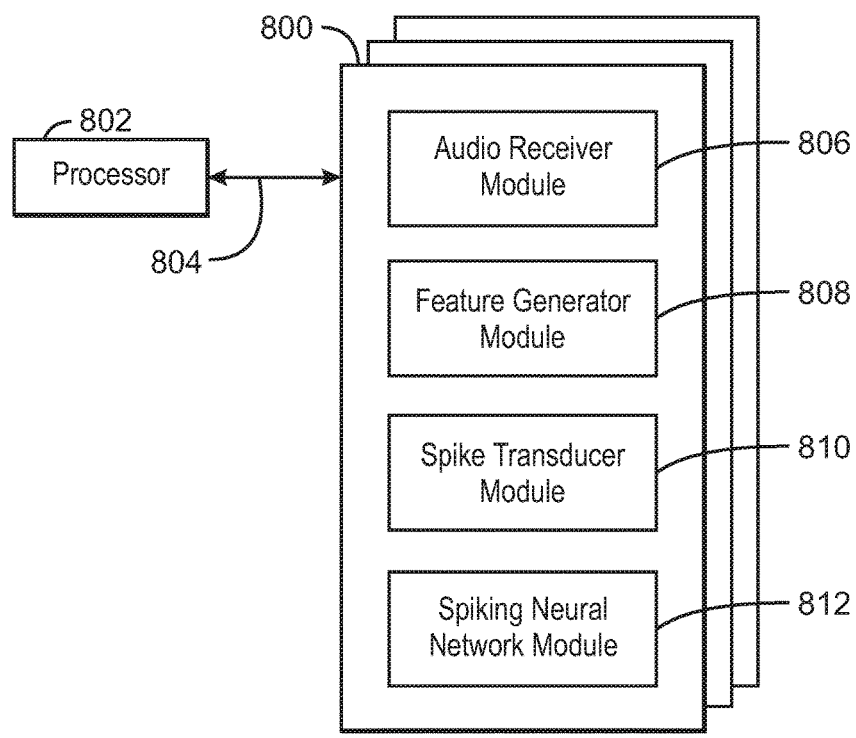
FIG. 8 is a block diagram showing computer readable media that store code for detecting keywords using spikes.

FIG. 8 is a block diagram showing computer readable media 800 that store code for detecting keywords using spikes. The computer readable media 800 may be accessed by a processor 802 over a computer bus 804. Furthermore, the computer readable medium 800 may include code configured to direct the processor 802 to perform the methods described herein. In some embodiments, the computer readable media 800 may be non-transitory computer readable media. In some examples, the computer readable media 800 may be storage media.

The various software components discussed herein may be stored on one or more computer readable media 800, as indicated in FIG. 8. For example, an audio receiver module 806 may be configured to receive audio including a keyword to be detected. A feature generator module 808 may be configured to convert the audio into a plurality of features. In some examples, the feature generator module 808 may be configured to generate a matrix of features over a predetermined number of frames. A spike transducer module 810 may be configured to transduce the audio into spikes. For example, the spike transducer 810 may be configured to flatten the features into an ordered set of features based on intensity, and transduce the ordered set of features into spikes. In some examples, the features can be audio parameters. For example, the audio parameters may be mel-frequency cepstral coefficients or linear predictive coding (LPC) features or any other frequency domain or time domain audio features similar to these audio parameter examples. For example, the feature generator module 808 may be configured to compute mel-frequency cepstral coefficients based on a predetermined sliding sample window size and sliding sample window step size and concatenate the mel-frequency cepstral coefficients based on a duration of a keyword that is longer than other keywords. In some examples, the sliding sample window step size for generating the plurality of features can be based on a feature step size. In some examples, the spike transducer 810 may be configured to send the plurality of spikes to a spiking neural network module 812. A spiking neural network module 812 may be configured to generate a spike corresponding to a detected keyword based on one or more of the plurality of spikes. In some examples, the spiking neural network module 812 may be a sparsely active network configured to activate in response to receiving the one or more spikes. For example, the spiking neural network module 812 may be configured to receive a plurality of spikes and output a single spike corresponding to a detected keyword based on one or more of the plurality of spikes. In some examples, the spiking neural network module 812 may be configured to send the spike corresponding to the detected keyword to an application. In some examples, the neural network module 812 may be configured to enter an idle mode in response to generating the spike corresponding to the detected keyword.

The block diagram of FIG. 8 is not intended to indicate that the computer readable media 800 is to include all of the components shown in FIG. 8. Further, the computer readable media 800 may include any number of additional components not shown in FIG. 8, depending on the details of the specific implementation. For example, the computer readable media 800 may include a training module to train a spiking neural network to generate the spike corresponding to the detected keyword. For example, the training module may be configured to receive audio including keywords to be trained to be detected and send the audio to the spike transducer 810 to convert the audio into training spikes. The training module may be configured to train the spiking neural network using the training spikes. In some examples, the training module can be configured to translate feature vectors to senones using an acoustic model based scoring.

EXAMPLES

Example 1 is an apparatus for detecting keywords in audio. The apparatus includes an audio receiver to receive audio including a keyword to be detected. The apparatus also includes a spike transducer to transduce the audio into a plurality of spikes. The apparatus further includes a spiking neural network to receive one or more of the spikes and generate a spike corresponding to a detected keyword.

Example 2 includes the apparatus of example 1, including or excluding optional features. In this example, the apparatus includes a feature generator to generate a plurality of features based on the audio, the features to be converted into spikes by the spike transducer.

Example 3 includes the apparatus of any one of examples 1 to 2, including or excluding optional features. In this example, the features include audio parameters.

Example 4 includes the apparatus of any one of examples 1 to 3, including or excluding optional features. In this example, a sliding sample window step size of the feature generator is a function of a feature step size.

Example 5 includes the apparatus of any one of examples 1 to 4, including or excluding optional features. In this example, the spike transducer is to convert the audio into the plurality of spikes using a sample window width based on a duration of a key-phrase that includes a duration that is based on a longest key phrase to be detected.

Example 6 includes the apparatus of any one of examples 1 to 5, including or excluding optional features. In this example, the spiking neural network is to enter an idle mode in response to generating the spike.

Example 7 includes the apparatus of any one of examples 1 to 6, including or excluding optional features. In this example, the spiking neural network is trained using training spikes generated from training audio samples.

Example 8 includes the apparatus of any one of examples 1 to 7, including or excluding optional features. In this example, the spiking neural network includes a sparsely active network.

Example 9 includes the apparatus of any one of examples 1 to 8, including or excluding optional features. In this example, the spiking neural network includes an output layer including a number of neurons based on a number of trained keywords to be detected.

Example 10 includes the apparatus of any one of examples 1 to 9, including or excluding optional features. In this example, the spike corresponding to the detected keyword is output using acoustic scoring and a decision state machine. The acoustic scoring includes mapping generated feature vectors to senomes using a spiking neural network.

Example 11 is a method for detecting keywords in audio. The method includes receiving, via a processor, audio including a keyword to be detected. The method also includes transducing, via the processor, the audio into a plurality of spikes. The method further includes sending, to a spiking neural network, one or more of the spikes. The method also further includes receiving, from the spiking neural network, a spike corresponding to a detected keyword.

Example 12 includes the method of example 11, including or excluding optional features. In this example, transducing the audio into spikes includes generating a plurality of features based on the audio, and transducing the features into the spikes.

Example 13 includes the method of any one of examples 11 to 12, including or excluding optional features. In this example, generating the plurality of features includes computing mel-frequency cepstral coefficients based on a predetermined sliding sample window size and sliding sample window step size and concatenating the mel-frequency cepstral coefficients based on a duration of a keyword that is based on a longest key phrase to be detected.

Example 14 includes the method of any one of examples 11 to 13, including or excluding optional features. In this example, generating the plurality of features includes computing linear predictive coding (LPC) features.

Example 15 includes the method of any one of examples 11 to 14, including or excluding optional features. In this example, the method includes training the spiking neural network, wherein training the spiking neural network includes: receiving, via the processor, audio including keywords to be trained to be detected; converting, via the processor, the audio into training spikes; and training, via the processor, the spiking neural network using the training spikes.

Example 16 includes the method of any one of examples 11 to 15, including or excluding optional features. In this example, the method includes sending the detected keyword to an application.

Example 17 includes the method of any one of examples 11 to 16, including or excluding optional features. In this example, the spiking neural network includes a sparsely activated network that is activated in response to receiving the one or more spikes from the processor.

Example 18 includes the method of any one of examples 11 to 17, including or excluding optional features. In this example, the method includes activating an idle mode in response to generating the spike corresponding to the detected keyword.

Example 19 includes the method of any one of examples 11 to 18, including or excluding optional features. In this example, transducing the audio into the plurality of spikes includes generating a matrix of features over a predetermined number of frames and transducing the matrix of features into the plurality of spikes.

Example 20 includes the method of any one of examples 11 to 19, including or excluding optional features. In this example, transducing the audio into the plurality of spikes includes flattening the features into an ordered set of features based on intensity.

Example 21 is at least one computer readable medium for detecting keywords in audio having instructions stored therein that direct the processor to receive audio including a keyword to be detected. The computer-readable medium also includes instructions that direct the processor to transduce the audio into a plurality of spikes. The computer-readable medium further includes instructions that direct the processor to generate a spike corresponding to a detected keyword based on one or more of the plurality of spikes.

Example 22 includes the computer-readable medium of example 21, including or excluding optional features. In this example, the computer-readable medium includes instructions to convert the audio into a plurality of features, and transduce the features into the plurality of spikes.

Example 23 includes the computer-readable medium of any one of examples 21 to 22, including or excluding optional features. In this example, the computer-readable medium includes instructions to enter an idle mode in response to generating the spike corresponding to the detected keyword.

Example 24 includes the computer-readable medium of any one of examples 21 to 23, including or excluding optional features. In this example, the computer-readable medium includes instructions to generate a matrix of features over a predetermined number of frames, flatten the features into an ordered set of features based on intensity, and transduce the ordered set of features into the plurality of spikes.

Example 25 includes the computer-readable medium of any one of examples 21 to 24, including or excluding optional features. In this example, the computer-readable medium includes instructions to train a spiking neural network to translate a feature to senones using an acoustic model based scoring.

Example 26 includes the computer-readable medium of any one of examples 21 to 25, including or excluding optional features. In this example, the computer-readable medium includes instructions to compute mel-frequency cepstral coefficients based on a predetermined sliding sample window size and sliding sample window step size and concatenate the mel-frequency cepstral coefficients based on a duration of a keyword that is longer than other keywords.

Example 27 includes the computer-readable medium of any one of examples 21 to 26, including or excluding optional features. In this example, the computer-readable medium includes instructions to receive audio including keywords to be trained to be detected. The computer-readable medium also includes instructions to convert the audio into training spikes. The computer-readable medium further includes instructions to and train the spiking neural network using the training spikes.

Example 28 includes the computer-readable medium of any one of examples 21 to 27, including or excluding optional features. In this example, the computer-readable medium includes instructions to compute linear predictive coding (LPC) features.

Example 29 includes the computer-readable medium of any one of examples 21 to 28, including or excluding optional features. In this example, the computer-readable medium includes instructions to send the spike corresponding to the detected keyword to an application.

Example 30 includes the computer-readable medium of any one of examples 21 to 29, including or excluding optional features. In this example, the computer-readable medium includes instructions to send the plurality of spikes to a spiking neural network. The spiking neural network includes a sparsely activated network that is activated in response to receiving the one or more spikes.

Example 31 is a system for detecting keywords in audio. The system includes an audio receiver to receive audio including a keyword to be detected. The system also includes a spike transducer to transduce the audio into a plurality of spikes. The system further includes a spiking neural network to receive one or more of the spikes and generate a spike corresponding to a detected keyword.

Example 32 includes the system of example 31, including or excluding optional features. In this example, the system includes a feature generator to generate a plurality of features based on the audio. The features are to be converted into spikes by the spike transducer.

Example 33 includes the system of any one of examples 31 to 32, including or excluding optional features. In this example, the features include audio parameters.

Example 34 includes the system of any one of examples 31 to 33, including or excluding optional features. In this example, a sliding sample window step size of the feature generator is a function of a feature step size.

Example 35 includes the system of any one of examples 31 to 34, including or excluding optional features. In this example, the spike transducer is to convert the audio into the plurality of spikes using a sample window width based on a duration of a key-phrase that includes a duration that is based on a longest key phrase to be detected.

Example 36 includes the system of any one of examples 31 to 35, including or excluding optional features. In this example, the spiking neural network is to enter an idle mode in response to generating the spike.

Example 37 includes the system of any one of examples 31 to 36, including or excluding optional features. In this example, the spiking neural network is trained using training spikes generated from training audio samples.

Example 38 includes the system of any one of examples 31 to 37, including or excluding optional features. In this example, the spiking neural network includes a sparsely active network.

Example 39 includes the system of any one of examples 31 to 38, including or excluding optional features. In this example, the spiking neural network includes an output layer including a number of neurons based on a number of trained keywords to be detected.

Example 40 includes the system of any one of examples 31 to 39, including or excluding optional features. In this example, the spike corresponding to the detected keyword is output using acoustic scoring and a decision state machine. The acoustic scoring includes mapping generated feature vectors to senomes using a spiking neural network.

Example 41 is a system for detecting keywords in audio. The system includes means for receiving audio including a keyword to be detected. The system also includes means for transducing the audio into a plurality of spikes. The system further includes means for receiving one or more of the spikes and generating a spike corresponding to a detected keyword.

Example 42 includes the system of example 41, including or excluding optional features. In this example, the system includes means for generating a plurality of features based on the audio. The features are to be converted into spikes by the means for transducing the audio.

Example 43 includes the system of any one of examples 41 to 42, including or excluding optional features. In this example, the features include audio parameters.

Example 44 includes the system of any one of examples 41 to 43, including or excluding optional features. In this example, a sliding sample window step size of the feature generator is a function of a feature step size.

Example 45 includes the system of any one of examples 41 to 44, including or excluding optional features. In this example, the means for transducing the audio is to convert the audio into the plurality of spikes using a sample window width based on a duration of a key-phrase that includes a duration that is based on a longest key phrase to be detected.

Example 46 includes the system of any one of examples 41 to 45, including or excluding optional features. In this example, the means for generating the spike corresponding to the detected keyword is to enter an idle mode in response to generating the spike.

Example 47 includes the system of any one of examples 41 to 46, including or excluding optional features. In this example, the means for generating the spike corresponding to the detected keyword is trained using training spikes generated from training audio samples.

Example 48 includes the system of any one of examples 41 to 47, including or excluding optional features. In this example, the means for generating the spike corresponding to the detected keyword includes a sparsely active network.

Example 49 includes the system of any one of examples 41 to 48, including or excluding optional features. In this example, the means for generating the spike corresponding to the detected keyword includes an output layer including a number of neurons based on a number of trained keywords to be detected.

Example 50 includes the system of any one of examples 41 to 49, including or excluding optional features. In this example, the spike corresponding to the detected keyword is output using acoustic scoring and a decision state machine. The acoustic scoring includes mapping generated feature vectors to senomes using a spiking neural network.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for detecting keywords in audio, comprising:
an audio receiver to receive audio comprising a keyword to be detected;
a spike transducer to transduce the audio into a plurality of spikes, the spike transducer to convert the audio into the plurality of spikes using a sample window width based on a duration of a key-phrase that comprises a duration that is based on a longest key phrase to be detected; and
a spiking neural network to receive one or more of the spikes and generate a spike corresponding to a detected keyword.

2. The apparatus of claim 1, comprising a feature generator to generate a plurality of features based on the audio, the features to be converted into spikes by the spike transducer.

3. The apparatus of claim 2, wherein the features comprise audio parameters.

4. The apparatus of claim 2, wherein a sliding sample window step size of the feature generator is a function of a feature step size.

5. The apparatus of claim 1, wherein the spiking neural network is to enter an idle mode in response to generating the spike.

6. The apparatus of claim 1, wherein the spiking neural network is trained using training spikes generated from training audio samples.

7. The apparatus of claim 1, wherein the spiking neural network comprises a sparsely active network.

8. The apparatus of claim 1, wherein the spiking neural network comprises an output layer comprising a number of neurons based on a number of trained keywords to be detected.

9. The apparatus of claim 1, wherein the spike corresponding to the detected keyword is output using acoustic scoring and a decision state machine, wherein the acoustic scoring comprises mapping generated feature vectors to senomes using a spiking neural network.

10. A method for detecting keywords in audio, comprising:
receiving, via a processor, audio comprising a keyword to be detected;
transducing, via the processor, the audio into a plurality of spikes, wherein transducing the audio into spikes comprises generating a plurality of features based on the audio, and transducing the features into the spikes, wherein generating the plurality of features comprises computing mel-frequency cepstral coefficients based on a predetermined sliding sample window size and sliding sample window step size and concatenating the mel-frequency cepstral coefficients based on a duration of a keyword that is based on a longest key phrase to be detected;
sending, to a spiking neural network, one or more of the spikes; and
receiving, from the spiking neural network, a spike corresponding to a detected keyword.

11. The method of claim 10, wherein generating the plurality of features comprises computing linear predictive coding (LPC) features.

12. The method of claim 10, comprising training the spiking neural network, wherein training the spiking neural network comprises:
receiving, via the processor, audio comprising keywords to be trained to be detected;
converting, via the processor, the audio into training spikes; and
training, via the processor, the spiking neural network using the training spikes.

13. The method of claim 10, comprising sending the detected keyword to an application.

14. The method of claim 10, wherein the spiking neural network comprises a sparsely activated network that is activated in response to receiving the one or more spikes from the processor.

15. The method of claim 10, comprising activating an idle mode in response to generating the spike corresponding to the detected keyword.

16. The method of claim 10, wherein transducing the audio into the plurality of spikes comprises generating a matrix of features over a predetermined number of frames and transducing the matrix of features into the plurality of spikes.

17. The method of claim 10, wherein transducing the audio into the plurality of spikes comprises flattening the features into an ordered set of features based on intensity.

18. At least one non-transitory computer readable medium for detecting keywords in audio having instructions stored therein that, in response to being executed on a computing device, cause the computing device to:
receive audio comprising a keyword to be detected;
transduce the audio into a plurality of spikes, converting the audio into the plurality of spikes using a sample window width based on a duration of a key-phrase that comprises a duration that is based on a longest key phrase to be detected; and
generate a spike corresponding to a detected keyword based on one or more of the plurality of spikes.

19. The at least one non-transitory computer readable medium of claim 18, comprising instructions to convert the audio into a plurality of features, and transduce the features into the plurality of spikes.

20. The at least one non-transitory computer readable medium of claim 18, comprising instructions to enter an idle mode in response to generating the spike corresponding to the detected keyword.

21. The at least one non-transitory computer readable medium of claim 18, comprising instructions to generate a matrix of features over a predetermined number of frames, flatten the features into an ordered set of features based on intensity, and transduce the ordered set of features into the plurality of spikes.

22. The at least one non-transitory computer readable medium of claim 18, comprising instructions to train a spiking neural network to translate a feature to senones using an acoustic model based scoring.

* * * * *